(12) United States Patent
Takahashi et al.

(10) Patent No.: US 10,757,594 B2
(45) Date of Patent: Aug. 25, 2020

(54) USER EQUIPMENT, BASE STATION AND UPLINK CARRIER AGGREGATION COMMUNICATION METHOD

(71) Applicant: NTT DOCOMO, INC., Tokyo (JP)

(72) Inventors: Hideaki Takahashi, Tokyo (JP); Kei Andou, Tokyo (JP); Hiromasa Umeda, Tokyo (JP); Wuri Andarmawanti Hapsari, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 191 days.

(21) Appl. No.: 15/114,425

(22) PCT Filed: Nov. 5, 2015

(86) PCT No.: PCT/JP2015/081128
§ 371 (c)(1),
(2) Date: Jul. 27, 2016

(87) PCT Pub. No.: WO2016/072443
PCT Pub. Date: May 12, 2016

(65) Prior Publication Data
US 2016/0345193 A1    Nov. 24, 2016

(30) Foreign Application Priority Data

Nov. 7, 2014  (JP) ................................. 2014-227473
Jan. 28, 2015  (JP) ................................. 2015-014550
(Continued)

(51) Int. Cl.
*H04W 24/10*    (2009.01)
*H04W 88/06*    (2009.01)
(Continued)

(52) U.S. Cl.
CPC ............ *H04W 24/10* (2013.01); *G01S 5/0036* (2013.01); *G01S 19/17* (2013.01); *G01S 19/21* (2013.01);
(Continued)

(58) Field of Classification Search
CPC ........ G01S 5/0036; G01S 19/17; G01S 19/21; H04W 16/14; H04W 24/10; H04W 72/0453; H04W 72/1284; H04W 88/06
(Continued)

(56) References Cited

U.S. PATENT DOCUMENTS

2011/0086664 A1    4/2011  Li et al.
2013/0065533 A1    3/2013  Cai et al.
(Continued)

FOREIGN PATENT DOCUMENTS

CN    103391180 A    11/2013
JP    2013520879 A    6/2013
(Continued)

OTHER PUBLICATIONS

Office Action issued in corresponding Japanese Application No. 2016-534742, dated Apr. 11, 2017 (10 pages).
(Continued)

*Primary Examiner* — Dao L Phan
(74) *Attorney, Agent, or Firm* — Osha Liang LLP

(57) ABSTRACT

One aspect of the present invention relates to user equipment having an uplink carrier aggregation function, comprising: a radio communication control unit configured to control radio communication with a base station; a radio positioning unit configured to perform a radio positioning function based on a radio signal received from a positioning system; and a radio positioning state reporting unit configured to report,
(Continued)

when uplink carrier aggregation is configured, activation or deactivation of the radio positioning function to the base station.

6 Claims, 16 Drawing Sheets

(30) Foreign Application Priority Data

May 14, 2015 (JP) .................................. 2015-098863
Aug. 14, 2015 (JP) .................................. 2015-160090

(51) Int. Cl.
| | | |
|---|---|---|
| H04W 16/14 | (2009.01) | |
| H04W 52/34 | (2009.01) | |
| H04W 72/12 | (2009.01) | |
| G01S 5/00 | (2006.01) | |
| H04W 4/90 | (2018.01) | |
| G01S 19/17 | (2010.01) | |
| G01S 19/21 | (2010.01) | |
| G01S 19/34 | (2010.01) | |
| H04W 52/02 | (2009.01) | |
| H04W 72/04 | (2009.01) | |
| H04L 5/00 | (2006.01) | |
| H04W 64/00 | (2009.01) | |

(52) U.S. Cl.
CPC .............. *G01S 19/34* (2013.01); *H04W 4/90* (2018.02); *H04W 16/14* (2013.01); *H04W 52/0212* (2013.01); *H04W 52/34* (2013.01); *H04W 72/0453* (2013.01); *H04W 72/1284* (2013.01); *H04W 88/06* (2013.01); *H04L 5/001* (2013.01); *H04W 64/00* (2013.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/26* (2018.01)

(58) Field of Classification Search
USPC .............. 342/357.2, 357.21, 357.49, 357.59; 701/468, 474
See application file for complete search history.

(56) References Cited

U.S. PATENT DOCUMENTS

| | | | |
|---|---|---|---|
| 2013/0287009 A1 | 10/2013 | Ahn et al. | |
| 2015/0049705 A1* | 2/2015 | Feuersaenger .... | H04W 72/1215 370/329 |

FOREIGN PATENT DOCUMENTS

| | | |
|---|---|---|
| JP | 2014505422 A | 2/2014 |
| JP | 2014527380 A | 10/2014 |
| JP | 2016502771 A | 1/2016 |
| WO | 2012051952 A1 | 4/2012 |
| WO | 2014/044436 A1 | 3/2014 |
| WO | 2014/047894 A1 | 4/2014 |
| WO | 2014053939 A2 | 4/2014 |
| WO | 2014/067131 A1 | 5/2014 |

OTHER PUBLICATIONS

Office Action issued in the counterpart Japanese Patent Application No. 2016-534742, dated Aug. 1, 2017 (7 pages).
Extended European Search Report issued in the counterpart European Patent Application No. 15857607.4, dated Sep. 29, 2017 (10 pages).
International Search Report issued in PCT/JP2015/081128 dated Jan. 12, 2016 (2 pages).
Written Opinion of the International Searching Authority issued in PCT/JP2015/081128 dated Jan. 12, 2016 (7 pages).
3GPP TS 36.300 V12.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Sep. 2014 (215 pages).
3GPP TS 36.331 V12.3.0; "3rd Generation Partnership Project; Technical Specification Group Radio Access Network; Evolved Universal Terrestrial Radio Access (E-UTRA); Radio Resource Control (RRC); Protocol specification (Release 12)"; Sep. 2014 (378 pages).
3GPP TS 36.306 V11.8.0; "3rd Generation Partnership Project; Technical Specification Group Radio Access Network; Evolved Universal Terrestrial Radio Access (E-UTRA); User Equipment (UE) radio access capabilities (Release 11)"; Sep. 2014 (30 pages).
3GPP TS 36.331 V11.9.0; "3rd Generation Partnership Project; Technical Specification Group Radio Access Network; Evolved Universal Terrestrial Radio Access (E-UTRA); Radio Resource Control (RRC); Protocol specification (Release 11)"; Sep. 2014 (356 pages).
3GPP TS 36.300 V11.11.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2014 (210 pages).
NTT Docomo, Inc.; "LS on 2UL inter-band CA protection of GNSS"; 3GPP TSG-RAN WG4 Meeting #73, R4-148117; San Francisco, USA; Nov. 17-21, 2014 (2 pages).
NTT Docomo, Inc.; "WF on 2UL inter-band CA protection of GNSS"; 3GPP TSG-RAN WG4 Meeting #73, R4-147274; San Francisco, USA; Nov. 17-21, 2014 (4 pages).
Office Action issued in corresponding Japanese Application No. 2016-534742, dated Dec. 12, 2017 (9 pages).
Qualcomm Incorporated; "In-Device Coexistence Improvements (for UL inter-band CA interference on GNSS receiver)"; 3GPP TSG-RAN WG2 Meeting #88, R2-145162; San Francisco, USA; Nov. 17-21, 2014 (8 pages).
Office Action issued in the counterpart European Patent Application No. 15857607.4, dated Apr. 11, 2018 (6 pages).
Office Action issued in the counterpart Japanese Patent Application No. 2016534742, dated Apr. 10, 2018 (9 pages).
Office Action issued in the counterpart European Patent Application No. 15857607.4, dated Mar. 19, 2019 (6 pages).
NTT Docomo, Inc.; "How to handle IMD interference for GNSS"; 3GPP TSG-RAN WG4 Meeting #72bis, R4-145947; Singapore, Oct. 6-10, 2014 (2 Pages).
Office Action issued in counterpart Chinese Patent Application No. 201580006273.X, dated Oct. 9, 2019 (18 Pages).
Huawei; "TR 36.860 V0.2.0: Dual uplink inter-band CA" 3GPP TSG-RAN WG4 Meeting #68, R4-134778; Riga, Latvia; Oct. 7-11, 2013 (41 pages).
Trial and Appeal Decision Issued in JP 2016-534742, dated Aug. 13, 2019 (27 pages).

* cited by examiner

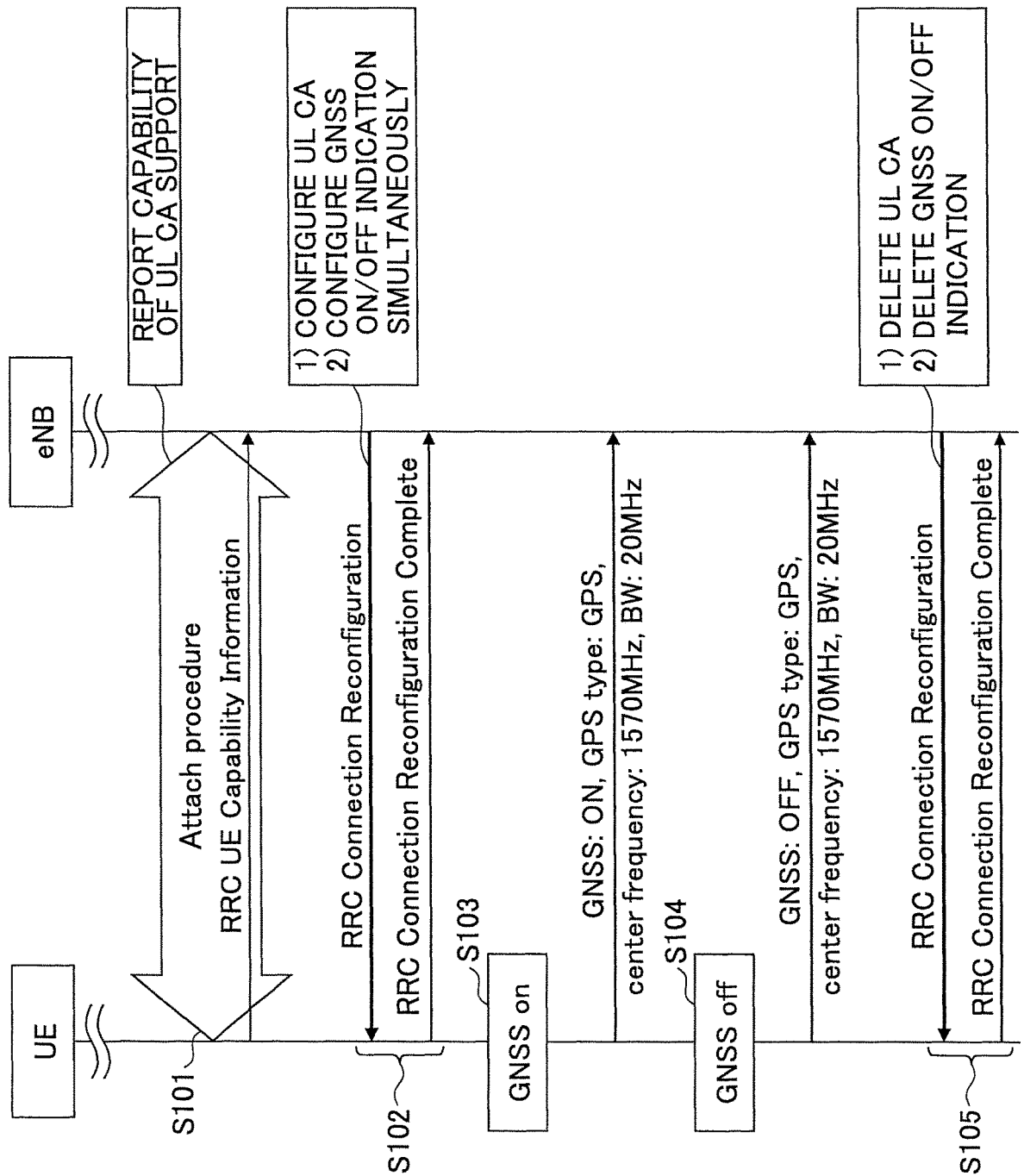

FIG.6

***OtherConfig* information element**

```
-- ASN1START

OtherConfig-r9 ::=       SEQUENCE {
    reportProximityConfig-r9        ReportProximityConfig-r9    OPTIONAL,    -- Need ON
    ...,
    [[ idc-Config-r11                IDC-Config-r11              OPTIONAL,    -- Need ON
       powerPrefIndicationConfig-r11 PowerPrefIndicationConfig-r11 OPTIONAL,  -- Need ON
       obtainLocationConfig-r11      ObtainLocationConfig-r11    OPTIONAL     -- Need ON
    ]]
}

IDC-Config-r11 ::=       SEQUENCE {
    idc-Indication-r11              ENUMERATED {setup}          OPTIONAL,    -- Need OR
    autonomousDenialParameters-r11  SEQUENCE {
        autonomousDenialSubframes-r11   ENUMERATED {n2, n5, n10, n15,
                                                    n20, n30, spare2, spare1},
        autonomousDenialValidity-r11    ENUMERATED {
                                            sf200, sf500, sf1000, sf2000,
                                            spare4, spare3, spare2, spare1}
    }                               OPTIONAL,           -- Need OR
    ...,
    [[ idc-ForGNSS-r11              BOOLEAN,
    ]]
}

ObtainLocationConfig-r11 ::= SEQUENCE {
    obtainLocation-r11              ENUMERATED {setup}          OPTIONAL     -- Need OR
}

PowerPrefIndicationConfig-r11 ::= CHOICE{
    release             NULL,
    setup               SEQUENCE{
        powerPrefIndicationTimer-r11    ENUMERATED {s0, s0dot5, s1, s2, s5, s10, s20,
                                                    s30, s60, s90, s120, s300, s600, spare3,
                                                    spare2, spare1}
    }
}

ReportProximityConfig-r9 ::= SEQUENCE {
    proximityIndicationEUTRA-r9     ENUMERATED {enabled}        OPTIONAL,    -- Need OR
    proximityIndicationUTRA-r9      ENUMERATED {enabled}        OPTIONAL     -- Need OR
}

-- ASN1STOP
```

*idc-ForGNSS*
The field is used to indicate whether the UE is configured to initiate transmission of the *InDeviceCoexIndication* message to the network for GNSS receiver protection when UL CA is configured.

FIG.7

InDeviceCoexIndication message

```
-- ASN1START

InDeviceCoexIndication-r11 ::=      SEQUENCE {
    criticalExtensions              CHOICE {
        c1                          CHOICE {
            inDeviceCoexIndication-r11          InDeviceCoexIndication-r11-IEs,
            spare3 NULL, spare2 NULL, spare1 NULL
        },
        criticalExtensionsFuture    SEQUENCE {}
    }
}

InDeviceCoexIndication-r11-IEs ::=  SEQUENCE {
    affectedCarrierFreqList-r11     AffectedCarrierFreqList-r11             OPTIONAL,
    tdm-AssistanceInfo-r11          TDM-AssistanceInfo-r11                  OPTIONAL,
    lateNonCriticalExtension        OCTET STRING (CONTAINING InDeviceCoexIndication-v11xy-IEs)
                                    OPTIONAL,
    nonCriticalExtension            SEQUENCE {}                             OPTIONAL
}

InDeviceCoexIndication-v11xy-IEs ::=    SEQUENCE {
    gNSS-Info-r11                   GNSS-Info-r11                           OPTIONAL,  -- Cond GNSS
    nonCriticalExtension            SEQUENCE {}                             OPTIONAL
}

AffectedCarrierFreqList-r11 ::= SEQUENCE (SIZE (1..maxFreqIDC-r11)) OF AffectedCarrierFreq-r11

AffectedCarrierFreq-r11 ::= SEQUENCE {
    carrierFreq-r11             MeasObjectId,
    interferenceDirection-r11   ENUMERATED {eutra, other, both, spare}
}

TDM-AssistanceInfo-r11 ::=  CHOICE {
    drx-AssistanceInfo-r11          SEQUENCE {
        drx-CycleLength-r11             ENUMERATED {sf40, sf64, sf80, sf128, sf160,
                                            sf256, spare2, spare1},
        drx-Offset-r11                  INTEGER (0..255)    OPTIONAL,
        drx-ActiveTime-r11              ENUMERATED {sf20, sf30, sf40, sf60, sf80,
                                            sf100, spare2, spare1}
    },
    idc-SubframePatternList-r11     IDC-SubframePatternList-r11,
    ...
}

IDC-SubframePatternList-r11 ::= SEQUENCE (SIZE (1..maxSubframePatternIDC-r11)) OF
IDC-SubframePattern-r11

IDC-SubframePattern-r11 ::= CHOICE {
    subframePatternFDD-r11          BIT STRING (SIZE (4)),
    subframePatternTDD-r11          CHOICE {
        subframeConfig0-r11             BIT STRING (SIZE (70)),
        subframeConfig1-5-r11           BIT STRING (SIZE (10)),
        subframeConfig6-r11             BIT STRING (SIZE (60))
    },
    ...
}

GNSS-Info-r11 ::=   SEQUENCE {
    gNSS-ReceiverActivation-r11     BOOLEAN,
    gNSS-Type-r11                   ENUMERATED {gps, galileo, glonass, spare},
    recvFreq-r11                    INTEGER (0..2000),
    channelBW-r11                   INTEGER (0..100),
}

-- ASN1STOP
```

*GNSS-Info*
Indicates whether GNSS receiver is turned on/off and GNSS type (e.g., GPS, Galileo, etc.), receiver center frequency (MHz) and channel bandwidth (MHz).

FIG.9

*PhysicalConfigDedicated information element*

```
-- ASN1START

PhysicalConfigDedicated ::=        SEQUENCE {
    pdsch-ConfigDedicated              PDSCH-ConfigDedicated            OPTIONAL,    -- Need ON
    pucch-ConfigDedicated              PUCCH-ConfigDedicated            OPTIONAL,    -- Need ON
    pusch-ConfigDedicated              PUSCH-ConfigDedicated            OPTIONAL,    -- Need ON
    uplinkPowerControlDedicated        UplinkPowerControlDedicated      OPTIONAL,    -- Need ON
    tpc-PDCCH-ConfigPUCCH              TPC-PDCCH-Config                 OPTIONAL,    -- Need ON
    tpc-PDCCH-ConfigPUSCH              TPC-PDCCH-Config                 OPTIONAL,    -- Need ON
    cqi-ReportConfig                   CQI-ReportConfig                 OPTIONAL,    -- Cond
CQI-r8
    soundingRS-UL-ConfigDedicated      SoundingRS-UL-ConfigDedicated    OPTIONAL,    -- Need ON
    antennaInfo                        CHOICE {
        explicitValue                      AntennaInfoDedicated,
        defaultValue                       NULL
    }       OPTIONAL,                                                                -- Cond AI-r8
    schedulingRequestConfig            SchedulingRequestConfig          OPTIONAL,    -- Need ON
    ....,
    [[  cqi-ReportConfig-v920          CQI-ReportConfig-v920            OPTIONAL,    -- Cond
CQI-r8
        antennaInfo-v920               AntennaInfoDedicated-v920        OPTIONAL     -- Cond AI-r8
    ]],
    [[  antennaInfo-r10                CHOICE {
```

```
eimta
        cqi-ReportConfigPCell-v12x0        CQI-ReportConfig-v12x0           OPTIONAL,    -- Need ON
        uplinkPowerControlDedicated-v12x0  UplinkPowerControlDedicated-v12x0 OPTIONAL,   -- Need
ON
        pusch-ConfigDedicated-v12x0        PUSCH-ConfigDedicated-v12x0      OPTIONAL,    -- Cond TwoSetsUL
        csi-RS-Config2-r12                 CSI-RS-Config2-r12               OPTIONAL     -- Need OR
    ]],
    [[  additionalSpectrumEmissionCA2-r12          CHOICE {
            release                                    NULL,
            setup                                      SEQUENCE {
                additionalSpectrumEmissionPCell2-r12       AdditionalSpectrumEmission
            }
        }                   OPTIONAL     -- Need ON
    ]]

}
PhysicalConfigDedicatedSCell-r10 ::=    SEQUENCE {
    -- DL configuration as well as configuration applicable for DL and UL
    nonUL-Configuration-r10                 SEQUENCE {
        antennaInfo-r10                         AntennaInfoDedicated-r10       OPTIONAL,    -- Need ON
        crossCarrierSchedulingConfig-r10        CrossCarrierSchedulingConfig-r10 OPTIONAL,  --
Need ON
        csi-RS-Config-r10                       CSI-RS-Config-r10              OPTIONAL,    -- Need ON
```

```
                                                CSI-RS-Config2-r12             OPTIONAL     -- Need OR
    ]]
}

CSI-RS-ConfigNZPToAddModList-r11 ::=   SEQUENCE (SIZE (1..maxCSI-RS-NZP-r11)) OF CSI-RS-ConfigNZP-r11

CSI-RS-ConfigNZPToReleaseList-r11 ::=  SEQUENCE (SIZE (1..maxCSI-RS-NZP-r11)) OF
CSI-RS-ConfigNZPId-r11

CSI-RS-ConfigZPToAddModList-r11 ::=  SEQUENCE (SIZE (1..maxCSI-RS-ZP-r11)) OF CSI-RS-ConfigZP-r11

CSI-RS-ConfigZPToReleaseList-r11 ::=   SEQUENCE (SIZE (1..maxCSI-RS-ZP-r11)) OF CSI-RS-ConfigZPId-r11

-- ASN1STOP
```

*additionalSpectrumEmissionPCell 2*
The UE requirements related to IE *AdditionalSpectrumEmissionPCell* for GNSS receiver protection are defined in TS 36.101 [42]. EUTRAN does not configure *AdditionalSpectrumEmissionPCell* if there are no other serving cells configured. This value is valid while the GNSS receiver is turned on. Otherwise, the UE shall apply the value received in the IE AdditionalSpectrumEmissionPCell.

FIG.10

RadioResourceConfigCommon information element

```
-- ASN1START

RadioResourceConfigCommonSIB ::=    SEQUENCE {
    rach-ConfigCommon                   RACH-ConfigCommon,
    bcch-Config                         BCCH-Config,
    pcch-Config                         PCCH-Config,
    prach-Config                        PRACH-ConfigSIB,
    pdsch-ConfigCommon                  PDSCH-ConfigCommon,
    pusch-ConfigCommon                  PUSCH-ConfigCommon,
    pucch-ConfigCommon                  PUCCH-ConfigCommon,
    soundingRS-UL-ConfigCommon          SoundingRS-UL-ConfigCommon,
    uplinkPowerControlCommon            UplinkPowerControlCommon,
    ul-CyclicPrefixLength               UL-CyclicPrefixLength,
    ...,
    [[  uplinkPowerControlCommon-v1020  UplinkPowerControlCommon-v1020   OPTIONAL    -- Need OR
    ]],
    [[  rach-ConfigCommon-v12xy         RACH-ConfigCommon-v12xy   OPTIONAL    -- Need OR
    ]]
}

RadioResourceConfigCommon ::=       SEQUENCE {
    rach-ConfigCommon                   RACH-ConfigCommon                 OPTIONAL,   -- Need ON
    prach-Config                        PRACH-Config,
    pdsch-ConfigCommon                  PDSCH-ConfigCommon                                    Need ON
```

```
                                        P-Max                             OPTIONAL,   -- Need OP
    uplinkPowerControlCommonSCell-r10   UplinkPowerControlCommonSCell-r10,
    -- A special version of IE UplinkPowerControlCommon may be introduced
    -- 3: Physical configuration, control
    soundingRS-UL-ConfigCommon-r10      SoundingRS-UL-ConfigCommon,
    ul-CyclicPrefixLength-r10           UL-CyclicPrefixLength,
    -- 4: Physical configuration, physical channels
    prach-ConfigSCell-r10                PRACH-ConfigSCell-r10    OPTIONAL,   -- Cond
TDD-OR-NoR11
    pusch-ConfigCommon-r10              PUSCH-ConfigCommon
                                                                 OPTIONAL,   -- Need OR
    },
    ...,
    [[  ul-CarrierFreq-v1090            ARFCN-ValueEUTRA-v9e0    OPTIONAL    -- Need OP
    ]],
    [[  rach-ConfigCommonSCell-r11      RACH-ConfigCommonSCell-r11   OPTIONAL,   -- Cond UL
        prach-ConfigSCell-r11           PRACH-Config                 OPTIONAL,   -- Cond UL
        tdd-Config-v1130                TDD-Config-v1130             OPTIONAL,   -- Cond TDD2
        uplinkPowerControlCommonSCell-v1130
                                        UplinkPowerControlCommonSCell-v1130 OPTIONAL   -- Cond UL
    ]],
    [[  additionalSpectrumEmissionSCell2-r12   AdditionalSpectrumEmission OPTIONAL   -- Need OR
    ]]
}

BCCH-Config ::=                     SEQUENCE {
    modificationPeriodCoeff             ENUMERATED {n2, n4, n8, n16}
}

PCCH-Config ::=                     SEQUENCE {
    defaultPagingCycle                  ENUMERATED {
                                            rf32, rf64, rf128, rf256},
    nB                                  ENUMERATED {
                                            fourT, twoT, oneT, halfT, quarterT, oneEighthT,
                                            oneSixteenthT, oneThirtySecondT}
}

UL-CyclicPrefixLength ::=           ENUMERATED {len1, len2}

-- ASN1STOP
```

*additionalSpectrumEmissionSCell2*
The UE requirements related to IE *AdditionalSpectrumEmissionSCell* for GNSS receiver protection are defined in TS 36.101 [42]. This value is valid while the GNSS receiver is turned on. Otherwise, the UE shall apply the value received in the IE AdditionalSpectrumEmissionSCell.

FIG.12

***OtherConfig* information element**

```
-- ASN1START

OtherConfig-r9 ::=           SEQUENCE {
    reportProximityConfig-r9        ReportProximityConfig-r9        OPTIONAL,       -- Need ON
    ...,
    [[ idc-Config-r11               IDC-Config-r11                  OPTIONAL,       -- Need ON
       powerPrefIndicationConfig-r11 PowerPrefIndicationConfig-r11  OPTIONAL,       -- Need ON
       obtainLocationConfig-r11     ObtainLocationConfig-r11        OPTIONAL        -- Need ON
    ]]
}

IDC-Config-r11 ::=           SEQUENCE {
    idc-Indication-r11               ENUMERATED {setup}             OPTIONAL,       -- Need OR
    autonomousDenialParameters-r11   SEQUENCE {
        autonomousDenialSubframes-r11    ENUMERATED {n2, n5, n10, n15,
                                                    n20, n30, spare2, spare1},
        autonomousDenialValidity-r11     ENUMERATED {
                                                    sf200, sf500, sf1000, sf2000,
                                                    spare4, spare3, spare2, spare1}
    }                                                                OPTIONAL,       -- Need OR
    ...,
    [[ autonomousDenialSCell-r12     ENUMERATED {setup}             OPTIONAL        -- Cond ULSCell
    ]]
}

ObtainLocationConfig-r11 ::= SEQUENCE {
    obtainLocation-r11               ENUMERATED {setup}                             OPTIONAL        -- Need OR
}

PowerPrefIndicationConfig-r11 ::= CHOICE{
    release                          NULL,
    setup                            SEQUENCE{
        powerPrefIndicationTimer-r11     ENUMERATED {s0, s0dot5, s1, s2, s5, s10, s20,
                                                     s30, s60, s90, s120, s300, s600, spare3,
                                                     spare2, spare1}
    }
}

ReportProximityConfig-r9 ::= SEQUENCE {
    proximityIndicationEUTRA-r9      ENUMERATED {enabled}           OPTIONAL,       -- Need OR
    proximityIndicationUTRA-r9       ENUMERATED {enabled}           OPTIONAL        -- Need OR
}

-- ASN1STOP
```

*autonomousDenialSCell*
The field is used to indicate whether the UE is allowed to drop UL transmissions on the SCells during an emergency call if UL resources are allocated on multiple CCs.

FIG.14

*InDeviceCoexIndication message*

```
-- ASN1START

InDeviceCoexIndication-r11 ::=    SEQUENCE {
    criticalExtensions            CHOICE {
        c1                        CHOICE {
            inDeviceCoexIndication-r11
```
```
        affec...                  ...rectedCarrierFreqList-r11           OPTIONAL,
        tdm-AssistanceInfo-r11    TDM-AssistanceInfo-r11                 OPTIONAL,
        lateNonCriticalExtension  OCTET STRING                           OPTIONAL,
        nonCriticalExtension      InDeviceCoexIndication-v11xy-IEs SEQUENCE {}
            OPTIONAL
}

InDeviceCoexIndication-v11xy-IEs ::=   SEQUENCE {
    victimSystemInfo-r11               VictimSystemInfo-r11        OPTIONAL,   -- Cond ULCA
    nonCriticalExtension               SEQUENCE {}                 OPTIONAL
}

AffectedCarrierFreqList-r11 ::= SEQUENCE (SIZE (1..maxFreqIDC-r11)) OF AffectedCarrierFreq-r11

AffectedCarrierFreq-r11 ::= SEQUENCE {
    carrierFreq-r11           MeasObjectId,
    interferenceDirection-r11 ENUMERATED {eutra, other, both, spare}
}

TDM-AssistanceInfo-r11 ::=  CHOICE {
    drx-AssistanceInfo-r11            SEQUENCE {
        drx-CycleLength-r11               ENUMER...
```
```
IDC-SubframePattern-r11 ::= CHOICE {
    subframePatternFDD-r11        BIT STRING (SIZE (4)),
    subframePatternTDD-r11        CHOICE {
        subframeConfig0-r11           BIT STRING (SIZE (70)),
        subframeConfig1-5-r11         BIT STRING (SIZE (10)),
        subframeConfig6-r11           BIT STRING (SIZE (60))
    },
    ...
}

VictimSystemInfo-r11 ::=    SEQUENCE {
    recvFreq-r11                  INTEGER (0..6000)
    channelBW-r11                 INTEGER (0..1000),
}
-- ASN1STOP
```

| *VictimSystemInfo* | |
|---|---|
| Indicates the receiver center frequency (MHz) and channel bandwidth (MHz) of the victim system due to IMD of UL CA. | |
| Conditional presence | Explanation |
| *ULCA* | The field is mandatory present if idc-ForULCA is set to TRUE in the OtherConfig IE. |

FIG.15

*OtherConfig* information element

```
-- ASN1START

OtherConfig-r9 ::= SEQUENCE {
    reportProximityConfig-r9       ReportProximityConfig-r9       OPTIONAL,    -- Need ON
    ...,
    [[ idc-Config-r11               IDC-Config-r11                 OPTIONAL,    -- Need ON
       powerPrefIndicationConfig-r11 PowerPrefIndicationConfig-r11 OPTIONAL,    -- Need ON
       obtainLocationConfig-r11     ObtainLocationConfig-r11       OPTIONAL     -- Need ON
    ]]
}

IDC-Config-r11 ::=              SEQUENCE {
    idc-Indication-r11                  ENUMERATED {setup}     OPTIONAL,    -- Need OR
    autonomousDenialParameters-r11      SEQUENCE {
            autonomousDenialSubframes-r11           ENUMERATED {n2, n5, n10, n15,
                                                        n20, n30, spare2, spare1},
            autonomousDenialValidity-r11            ENUMERATED {
                                                        sf200, sf500, sf1000, sf2000,
                                                        spare4, spare3, spare2, spare1}
    }   OPTIONAL,       -- Need OR
    ...,
    [[ idc-ForULCA-r11                  BOOLEAN
    ]]
}

ObtainLocationConfig-r11 ::= SEQUENCE {
    obtainLocation-r11              ENUMERATED {setup}              OPTIONAL    -- Need OR
}

PowerPrefIndicationConfig-r11 ::= CHOICE{
    release             NULL,
    setup               SEQUENCE{
        powerPrefIndicationTimer-r11        ENUMERATED {s0, s0dot5, s1, s2, s5, s10, s20,
                                                s30, s60, s90, s120, s300, s600, spare3,
                                                spare2, spare1}
    }
}

ReportProximityConfig-r9 ::= SEQUENCE {
    proximityIndicationEUTRA-r9     ENUMERATED {enabled}     OPTIONAL,    -- Need OR
    proximityIndicationUTRA-r9      ENUMERATED {enabled}     OPTIONAL     -- Need OR
}

-- ASN1STOP
```

*idc-ForULCA*
The field is used to indicate whether the UE is configured to initiate transmission of the *InDeviceCoexIndication* message to the network when UL CA is configured.

FIG.17

*InDeviceCoexIndication message*

```
-- ASN1START

InDeviceCoexIndication-r11 ::=      SEQUENCE {
    criticalExtensions              CHOICE {
        c1
```

```
        affectedCarrierFreqList-r11         AffectedCarrierFreqList-r11             OPTIONAL,
        tdm-AssistanceInfo-r11              TDM-AssistanceInfo-r11                  OPTIONAL,
        lateNonCriticalExtension            OCTET STRING                            OPTIONAL,
        nonCriticalExtension                InDeviceCoexIndication-v11xy-IEsSEQUENCE {}
            OPTIONAL
    }

InDeviceCoexIndication-v11xy-IEs ::=    SEQUENCE {
    fdm-AssistanceInfo-r11              FDM-AssistanceInfo-r11                          OPTIONAL,
    interferenceCauseUL-r11             ENUMERATED {imd, harmonics, spare2, spare1}     OPTIONAL,
    nonCriticalExtension                SEQUENCE {}                                     OPTIONAL
}

AffectedCarrierFreqList-r11 ::=     SEQUENCE (SIZE (1..maxFreqIDC-r11)) OF AffectedCarrierFreq-r11

AffectedCarrierFreq-r11 ::=     SEQUENCE {
    carrierFreq-r11                 MeasObjectId,
    interferenceDirection-r11       ENUMERATED {eutra, other, both, spare}
}

TDM-AssistanceInfo-r11 ::=      CHOICE {
    drx-AssistanceInfo-r11              SEQUENCE {
        drx-CycleLength-r11                 ENUMERATED {sf40, sf64, sf80, sf128, sf160,
                                                sf256, spare2sf20-v11xy, spare1},
        drx-Offset-r11                      INTEGER (0..255) OPTIONAL,
        drx-ActiveTime-r11                  ENUMERATED {sf20, sf30, sf40, sf60, sf80,
                                                sf100, spare2sf10-v11xy, spare1}
    },
    idc-SubframePatternList-r11         IDC-SubframePatternList-r11,
    ...
```

```
                                        BIT STRING (SIZE (10)},
        subframeConfig6-r11             BIT STRING (SIZE (60))
    },
    ...
}

FDM-AssistanceInfo-r11 ::=      SEQUENCE {
    victimSystemInfo-r11                ENUMERATED {gps, glonass, bds, galileo, wlan,
                                            bluetooth, spare2, spare1},
    victimCarrierFreq-r11               INTEGER (1..6000)                       OPTIONAL,
    victimChannelBandwidth-r11          INTEGER (1..200)                        OPTIONAL
}

-- ASN1STOP
```

*interferenceCauseUL*
Indicates the root cause of IDC interference from E-UTRA to another radio. Value *imd* indicates that IDC interference causes due to Inter-Modulation Distortion of simultaneous transmission of multiple E-UTRA carriers. Value *harmonics* indicates that IDC interference causes due to harmonics of an E-UTRA single carrier transmission. The other radio refers to either the ISM radio or GNSS (see 3GPP TR 36.816 [63]). The UE includes this field only if the *affectedCarrierFreqList* includes multiple E-UTRA carrier frequencies whose *interferenceDirection* is set to *other* or *both*.

USER EQUIPMENT, BASE STATION AND UPLINK CARRIER AGGREGATION COMMUNICATION METHOD

TECHNICAL FIELD

The present invention relates to a radio communication system.

BACKGROUND ART

In 3GPP (Third Generation Partnership Project), it is designed to enhance LTE (Long Term Evolution) systems and LTE-Advanced systems. Presently, it is discussed to introduce uplink carrier aggregation (UL CA) where the carrier aggregation technique is applied to uplink communication. In the uplink carrier aggregation, user equipment (UE) uses multiple component carriers (CCs) simultaneously to transmit uplink signals to a base station (evolved NodeB: eNB).

PRIOR ART DOCUMENT

Non-Patent Document

Non-Patent Document 1: 3GPP TS36.300 V12.3.0 (2014-09)
Non-Patent Document 2: 3GPP TS36.331 V12.3.0 (2014-09)
Non-Patent Document: 3GPP R4-148117

SUMMARY OF INVENTION

Problem to be Solved by the Invention

Typically, user equipment such as a smartphone and a tablet performs radio communication with GNSS (Global Navigation Satellite System) such as GPS (Global Positioning System) or other radio systems during communication with a base station. If the user equipment transmits radio signals in multiple carriers simultaneously while uplink carrier aggregation is configured, there are cases where inter-modulation distortion (IMD) caused by the uplink carrier aggregation falls in a reception band of other radio communication systems such as GNSS depending on combinations of carrier frequencies. For example, when an 800 MHz band and a 1.7 GHz band are used simultaneously in the uplink carrier aggregation, it is known that the fifth order inter-modulation distortion (IMD 5) arises in a band of 1535-1615 MHz. As illustrated in FIG. 1, since the occurrence area of the IMD 5 overlaps with reception bands of various GNSS signals, interference arises among devices in the user equipment. As a result, the user equipment cannot receive the GNSS signals during execution of the uplink carrier aggregation and accordingly cannot obtain position information.

In order to overcome the problem, it is discussed that base stations perform some control operations to prevent occurrence of the interference in cases where user equipment activates a radio positioning function during execution of the uplink carrier aggregation. For example, when the user equipment performs simultaneous transmission with multiple carriers, the base station may schedule resource blocks such that the interference with the GNSS signals cannot arise and cause the user equipment to transmit uplink data in the resource blocks. Also, even if the uplink carrier aggregation is configured, the base station may cause the user equipment to transmit uplink data in only one carrier. Also, the base station may delete configuration of the uplink carrier aggregation. Also, the base station may change a secondary cell (SCell) into a deactivation state. Also, the base station may cause the user equipment to reduce transmission power by using an A-MPR (Additional-Maximum Power Reduction) and so on, for example.

Meanwhile, in order to implement these control operations, the base station has to recognize whether the user equipment activates (ON) or deactivates (OFF) the radio positioning function. In the conventional LTE systems and LTE-Advanced systems, however, no solution for the base station to recognize the activation/deactivation of the radio positioning function at the user equipment has been discussed. Also, control operations to reduce transmission power of the user equipment only in activation of the radio positioning function have not been discussed.

In light of the above-stated problems, an object of the present invention is to provide some techniques for implementing radio positioning during uplink carrier aggregation communication.

Means for Solving the Problem

In order to achieve the above object, one aspect of the present invention relates to user equipment having an uplink carrier aggregation function, comprising: a radio communication control unit configured to control radio communication with a base station; a radio positioning unit configured to perform a radio positioning function based on a radio signal received from a positioning system; and a radio positioning state reporting unit configured to report, when uplink carrier aggregation is configured, activation or deactivation of the radio positioning function to the base station.

Another aspect of the present invention relates to a base station having an uplink carrier aggregation function, comprising: a radiocommunication control unit configured to control radio communication with user equipment; and a radio positioning report control unit configured to control a radio positioning report function for the user equipment to report activation or deactivation of a radio positioning function based on radio signals received from a positioning system, wherein when a frequency band resulting in interference with a radio signal from the positioning system in uplink carrier aggregation is configured for the user equipment, the radio positioning report control unit causes the user equipment to activate the radio positioning report function.

Another aspect of the present invention relates to an uplink carrier aggregation communication method between user equipment and a base station, comprising: configuring, by the base station, a frequency band resulting in interference with a radio signal from a positioning system in uplink carrier aggregation; causing, by the base station, the user equipment to activate a radio positioning report function to report activation or deactivation of a radio positioning function based on a radio signal received from the positioning system; reporting, by the user equipment, activation of the radio positioning function to the base station; and controlling, by the base station, radio communication with the user equipment to avoid the interference.

Another aspect of the present invention relates to user equipment having an uplink carrier aggregation function, comprising: a radio communication control unit configured to control radio communication with abase station; and an interfered system information reporting unit configured to report system information on an interfered system incurring interference due to uplink carrier aggregation to the base station.

Another aspect of the present invention relates to user equipment having an uplink carrier aggregation function, comprising: a radio communication control unit configured to control radio communication with abase station; and an interference cause indication unit configured to indicate an uplink interference cause to the base station.

Advantage of the Invention

According to the present invention, the radio positioning can be implemented during the uplink carrier aggregation communication.

BRIEF DESCRIPTION OF DRAWINGS

FIG. 5 is a sequence diagram for illustrating an uplink carrier aggregation communication operation according to one embodiment of the present invention;

FIG. 6 is a diagram for illustrating a signaling data structure according to one embodiment of the present invention;

FIG. 7 is a diagram for illustrating a signaling data structure according to one embodiment of the present invention;

FIG. 9 is a diagram for illustrating a signaling data structure according to one embodiment of the present invention;

FIG. 10 is a diagram for illustrating a signaling data structure according to one embodiment of the present invention;

FIG. 12 is a diagram for illustrating a signaling data structure according to one embodiment of the present invention;

FIG. 14 is a diagram for illustrating a signaling data structure according to another embodiment of the present invention;

FIG. 15 is a diagram for illustrating a signaling data structure according to another embodiment of the present invention;

FIG. 17 is a diagram for illustrating a signaling data structure according to another embodiment of the present invention.

EMBODIMENTS OF THE INVENTION

Embodiments of the present invention are described below with reference to the drawings.

In embodiments as stated below, user equipment and a base station having an uplink carrier aggregation function are disclosed. Summarizing embodiments as stated below, when the base station configures for the user equipment a frequency band where interference with positioning signals from a positioning system may arise due to inter-modulation distortion caused by uplink carrier aggregation, the base station configures the user equipment to report activation or deactivation of a radio positioning function. When the radio positioning report function is configured, the user equipment reports activation of the radio positioning function to the base station upon activating the radio positioning function. Upon receiving the report, the base station controls radio communication with the user equipment so as to avoid occurrence of the interference. For example, the base station may cause the user equipment to reduce transmission power so as to avoid the interference with positioning signals while the user equipment performs the radio positioning in the configured uplink carrier aggregation. As a result, the uplink carrier aggregation communication and the radio positioning can be performed simultaneously.

Figure 2A:
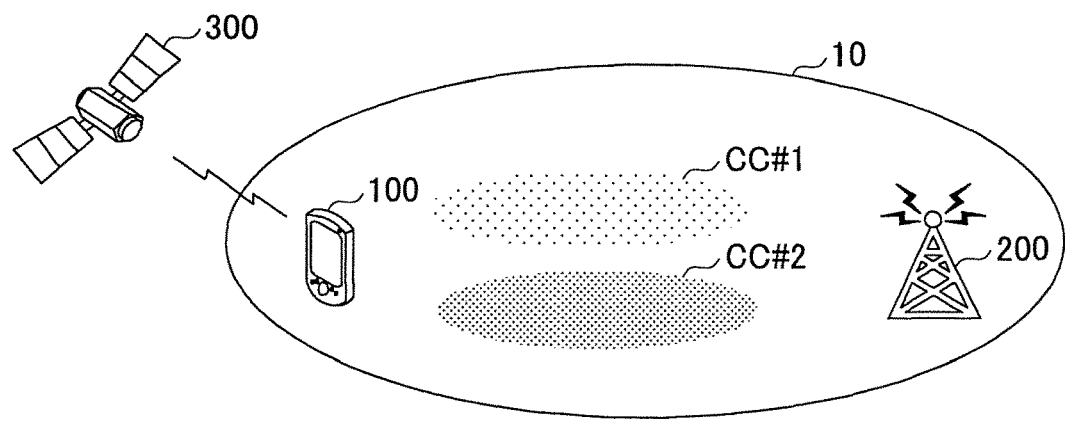
FIG. 2A is a schematic diagram for illustrating a radio communication system according to one embodiment of the present invention.

A radio communication system according to one embodiment of the present invention is described with reference to FIG. 2A. FIG. 2A is a schematic diagram for illustrating a radio communication system according to one embodiment of the present invention.

As illustrated in FIG. 2A, a radio communication system 10 has user equipment 100 and a base station 200. The radiocommunication system 10 supports uplink carrier aggregation, and as illustrated, the user equipment 100 can use multiple component carriers CC #1, CC #2 simultaneously to transmit radio signals to the base station 200. In the illustrated embodiment, the user equipment 100 performs uplink carrier aggregation communication with the single base station 200, but the present invention is not limited to it. For example, the user equipment 100 may use component carriers served by multiple base stations 200 simultaneously to perform simultaneous uplink transmissions to the multiple base stations 200. Also, in the illustrated embodiment, the only one base station 200 is illustrated, but a large number of base stations 200 are disposed to cover a service area of the radio communication system 10.

The user equipment 100 has an uplink carrier aggregation function to use multiple carriers served by the base station 200 simultaneously to transmit radio signals to the base station 200. Also, the user equipment 100 has a communication function to wirelessly communicate with another radio communication system such as a positioning system 300 (GNSS system).

Figure 2B:
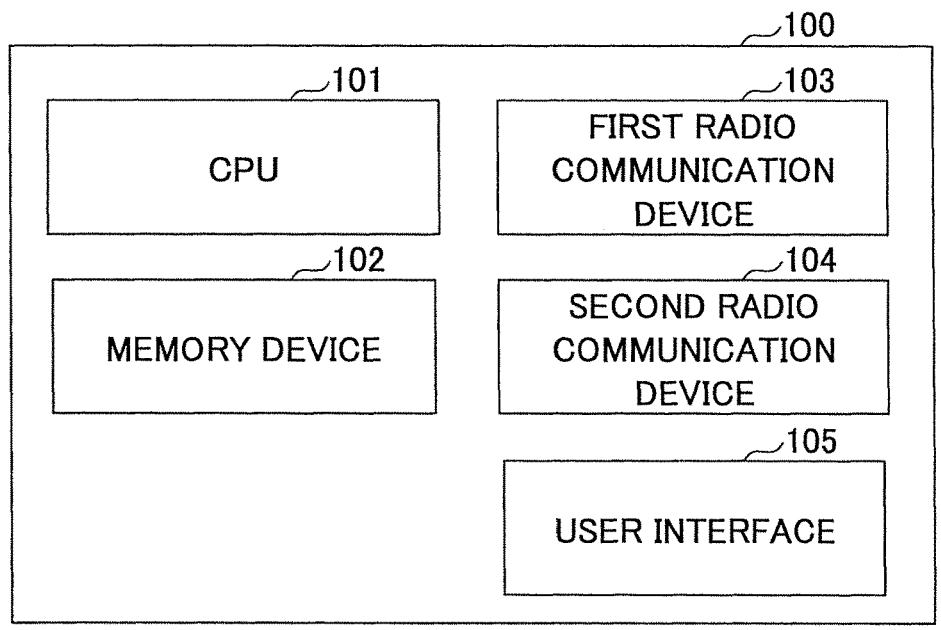
FIG. 2B is a block diagram for illustrating a hardware arrangement of user equipment according to one embodiment of the present invention.

Typically, as illustrated, the user equipment 100 may be any appropriate information processing device with radio communication functions such as a smartphone, a mobile phone, a tablet, a mobile router and a wearable terminal. As illustrated in FIG. 2B, the user equipment 100 is arranged with a CPU (Central Processing Unit) 101 such as a processor, a memory device 102 such as a RAM (Random Access Memory) and a flash memory, a first radio communication device 103 for transmitting and receiving radio signals to/from the base station 200, a second radio communication device 104 for transmitting and receiving radio signals to/from other radio communication systems such as the positioning system 300, and a user interface 105 such as an I/O device and a peripheral device. For example, functions and operations of the user equipment 100 as stated below may be implemented by the CPU 101 processing and running data and programs stored in the memory device 102. However, the user equipment 100 is not limited to the above-stated hardware arrangement and may be arranged with circuits for implementing one or more of operations as stated below.

The base station 200 establishes a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. The base station 200 has the uplink carrier aggregation function to receive radio signals from the user equipment 100 via multiple carriers simultaneously.

Figure 2C:
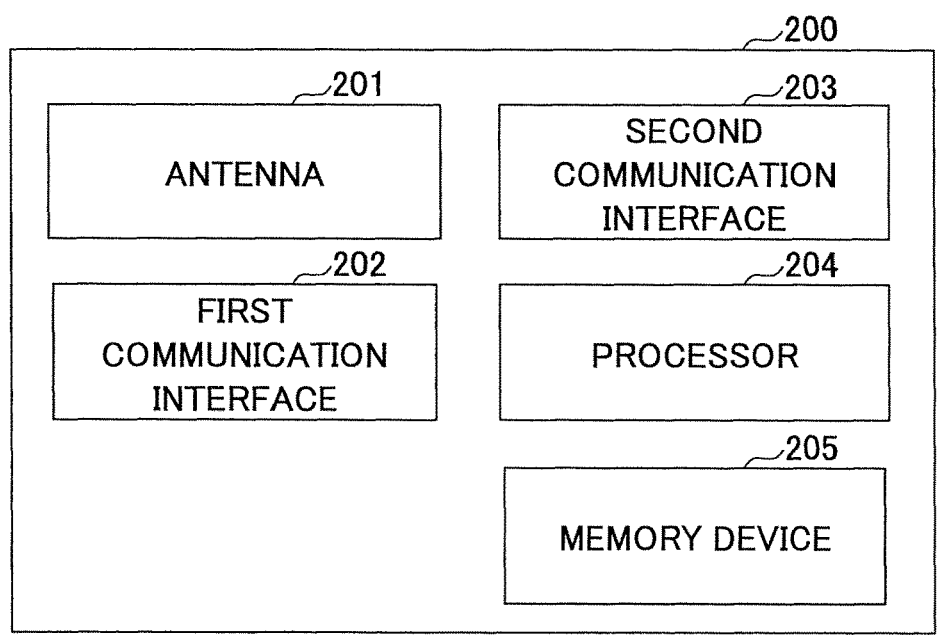
FIG. 2C is a block diagram for illustrating a hardware arrangement of a base station according to one embodiment of the present invention.

As illustrated in FIG. 2C, the base station 200 is typically arranged with hardware resources such as an antenna 201 for transmitting and receiving radio signals to/from the user equipment 100, a first communication interface 202 (such as a X2 interface) for communicating with adjacent base stations 200, a second communication interface 203 (such as a Si interface) for communicating with a core network, a processor 204 or a circuit for processing transmission and reception signals for the user equipment 100 and a memory device 205. Functions and operations of the base station 200 as stated below may be implemented by the processor 204 processing or running data and programs stored in the memory device 205. However, the base station 200 is not limited to the above-stated hardware arrangement and may have any other appropriate hardware arrangement.

Figure 1:
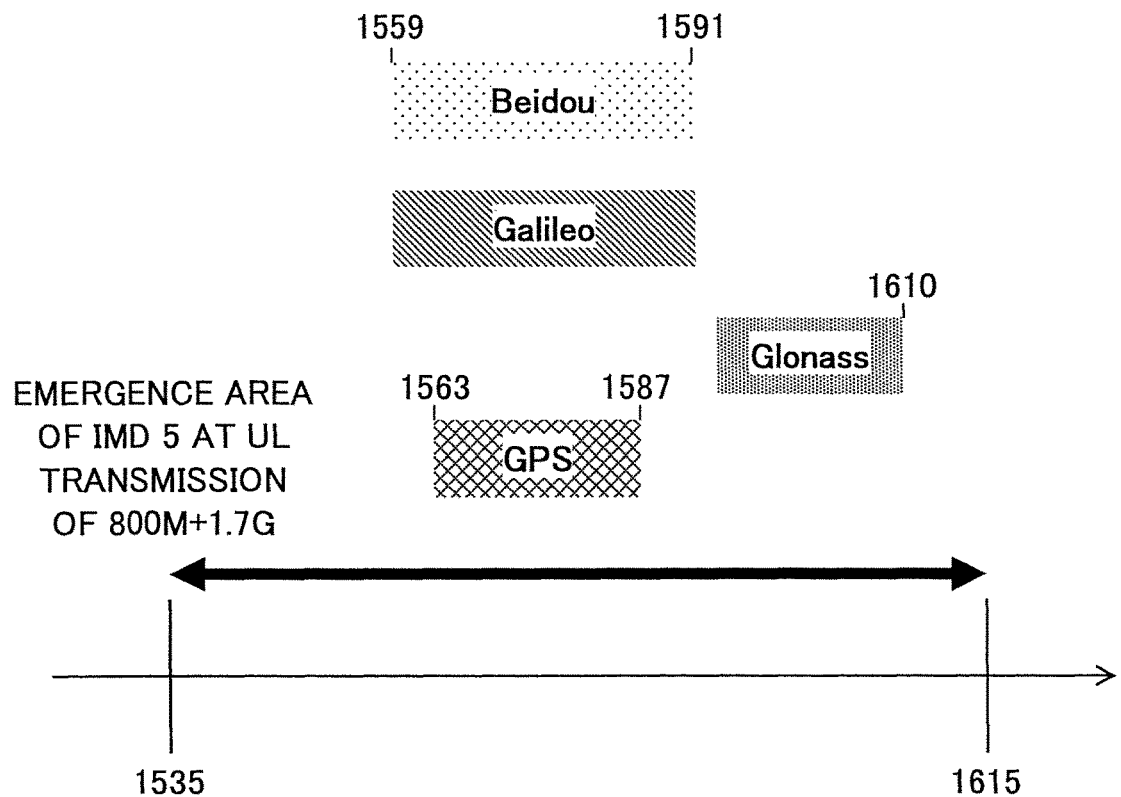
FIG. 1 is a diagram for illustrating interference with UL CA inter-modulation distortion in a GNSS reception band.

The positioning system 300 transmits a positioning signal to the user equipment 100. The positioning system 300 is a GNSS system such as a GPS system, a Glonass system, a Galileo system and a Beidou system and uses several satellites to transmit positioning signals to the user equipment 100 in respective frequency bands. As stated above with reference to FIG. 1, if a combination of a 800 MHz band and a 1.7 GHz band is used in the uplink carrier aggregation, it is known that an occurrence area of inter-modulation distortion caused by the combination overlaps with the frequency band of radio signals from the positioning system 300, and the user equipment 100 cannot receive the positioning signals appropriately during execution of the uplink carrier aggregation using the combination.

Embodiments as set forth are focused on cases where the frequency band overlapping with the occurrence area of the inter-modulation distortion caused by the uplink carrier aggregation corresponds to a reception band of radio signals from the positioning system 300. However, the present invention is not limited to the positioning system 300 and may be applied to any other radio communication system using a frequency band interfered with due to uplink transmission from the user equipment 100.

Figure 3:
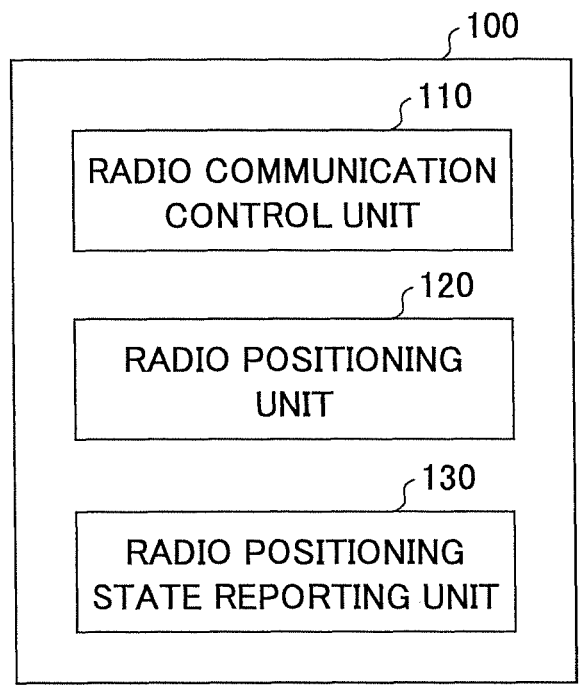
FIG. 3 is a block diagram for illustrating a functional arrangement of the user equipment according to one embodiment of the present invention.

Next, user equipment according to one embodiment of the present invention is described with reference to FIG. 3. FIG. 3 is a block diagram for illustrating a functional arrangement of the user equipment according to one embodiment of the present invention.

As illustrated in FIG. 3, the user equipment 100 has a radio communication control unit 110, a radio positioning unit 120 and a radio positioning state reporting unit 130.

The radio communication control unit 110 controls radio communication with the base station 200. Specifically, the radio communication control unit 110 transmits and receives various radio channels, such as uplink/downlink control channels and uplink/downlink data channels, to/from the base station 200 and uses multiple carriers served by the base station 200 simultaneously to perform uplink carrier aggregation to transmit radio signals to the base station 200.

The radio positioning unit 120 performs a radio positioning function based on a radio signal received from the positioning system 300. The radio positioning function measures position of the user equipment 100 based on positioning signals received from the positioning system 300. Upon activating the radio positioning function, the radio positioning unit 120 receives positioning signals transmitted from the positioning system 300 and identifies the position of the user equipment 100 based on the received positioning signals. Typically, the radio positioning unit 120 receives positioning signals transmitted from multiple satellites and identifies the position of the user equipment 100 from the received multiple positioning signals based on some well-known positioning algorithm. Typically, the radio positioning unit 120 is activated in response to an activation request from an application (for example, applications providing position related information such as a map application) used by the user.

The radio positioning state reporting unit 130 reports, when the uplink carrier aggregation is configured, activation or deactivation of the radio positioning function to the base station 200. Specifically, when the radio positioning unit 120 activates and/or deactivates the radio positioning function while the uplink carrier aggregation is configured for the user equipment 100, the radio positioning state reporting unit 130 indicates to the base station 200 that the radio positioning function has been activated and/or deactivated.

In one embodiment, the radio positioning state reporting unit 130 may be activated or deactivated in accordance with an instruction from the base station 200. Specifically, the base station 200 instructs the user equipment 100 to report activation and/or deactivation of the radio positioning function, and only if the report instruction is received, the radio positioning state reporting unit 130 may report activation and/or deactivation of the radio positioning function to the base station 200. As a result, only if carriers resulting in interference with a positioning signal from the positioning system 300 during execution of uplink carrier aggregation are configured for the user equipment 100, the base station 200 can cause the user equipment 100 to report activation and/or deactivation of the radio positioning function. In other words, in the case where the carriers resulting in interference with a positioning signal is not configured for the user equipment 100 even during execution of the uplink carrier aggregation, the base station 200 can avoid receiving unnecessary reports of activation and/or deactivation of the radio positioning function. Also, if the uplink carrier aggregation configured for the user equipment 100 is deleted, the base station 200 may stop causing the user equipment 100 to report activation and/or deactivation of the radio positioning function.

Upon receiving the report of activation and/or deactivation of the radio positioning function, the base station 200 can control radio communication with the user equipment 100 to avoid the interference. For example, while the user equipment 100 activates the radio positioning function, the base station 200 may schedule resource blocks, that do not result in interference with positioning signals, for the user equipment 100 in the uplink carrier aggregation and cause the user equipment 100 to transmit uplink data in the resource blocks. Also, even if the uplink carrier aggregation is configured, during activation of the radio positioning function at the user equipment 100, the base station 200 may cause the user equipment 100 to transmit uplink data by using only one carrier, delete the configured uplink carrier aggregation or deactivate a secondary cell (SCell).

In one embodiment, in response to reception of an instruction to reduce transmission power on behalf of the radio positioning function from the base station 200, the radio communication control unit 110 may reduce the transmission power during activation of the radio positioning function and perform uplink carrier aggregation communication with the base station 200. In order to reduce interference with positioning signals from the positioning system 300 due to inter-modulation distortion caused during execution of the uplink carrier aggregation, the radio communication control unit 110 may apply the transmission power reduction specified by the base station 200 to uplink communication. In LTE specifications, the base station 200 may specify the maximum transmission power to be reduced by the user equipment 100 by means of an A-MPR (Additional Maximum Power Reduction) parameter during activation of the radio positioning function in the configured uplink carrier aggregation. Then, when the radio positioning function is activated in the configured uplink carrier aggregation, the radio communication control unit 110 reduces the maximum transmission power by a power amount specified by the A-MPR during execution of the radio positioning.

In one embodiment, the radio positioning state reporting unit 130 may further report the positioning system 300, a center reception frequency of the positioning system 300 and a reception bandwidth of the positioning system 300 to the base station 200. In other words, when the radio positioning unit 120 activates or deactivates the radio positioning function, the radio positioning state reporting unit 130 may report the type, the center reception frequency and the reception bandwidth of the positioning system 300 used by the user equipment 100 together with the activation or deactivation of the radio positioning function. As stated above, the user equipment 100 can use various types of positioning systems 300 such as GPS, and the respective positioning systems 300 use their specific frequency bands. The respective user equipments 100 typically use only a portion of the frequency band of the positioning system 300 instead of the whole frequency band. From this reason, the radio positioning state reporting unit 130 may report the type, the center reception frequency and the reception bandwidth of the utilized positioning system 300 to the base station 200 together with the activation or deactivation of the radio positioning function. As a result, the base station 200 can know details of the frequency band used by the user equipment 100 to receive positioning signals and accordingly can control radio communication with the user equipment 100 more appropriately to avoid the interference.

Figure 4:
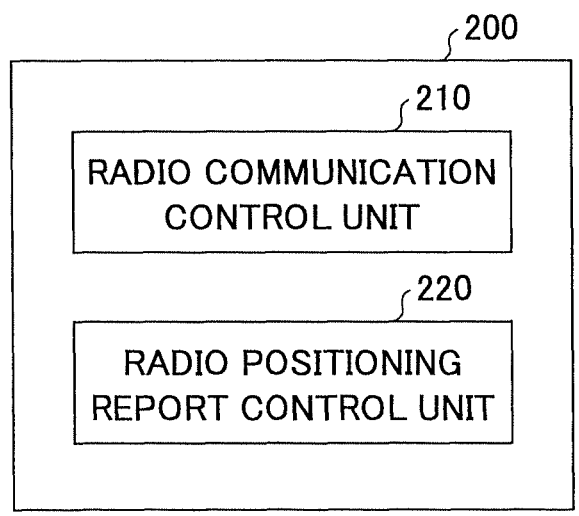
FIG. 4 is a block diagram for illustrating a functional arrangement of the base station according to one embodiment of the present invention.

Next, the base station according to one embodiment of the present invention is described with reference to FIG. 4. FIG. 4 is a block diagram for illustrating a functional arrangement of the base station according to one embodiment of the present invention.

As illustrated in FIG. 4, the base station 200 has a radio communication control unit 210 and a radio positioning report control unit 220.

The radio communication control unit 210 controls radio communication with the user equipment 100. Specifically, the radio communication control unit 210 transmits and receives various control and data signals to/from the user equipment 100 as well as receives radio signals from the user equipment 100 via multiple carriers in configured uplink carrier aggregation.

The radio positioning report control unit 220 controls a radio positioning report function for the user equipment 100 to report activation or deactivation of the radio positioning function based on radio signals received from the positioning system 300. When a frequency band resulting in interference with radio signals from the positioning system 300 is configured for the user equipment 100 in the uplink carrier aggregation, the radio positioning report control unit 220 causes the user equipment 100 to activate the radio positioning report function. In other words, the user equipment 100 has the radio positioning report function to report activation and/or deactivation of the above-stated radio positioning function to the base station 200, and the radio positioning report control unit 220 controls the activation and/or deactivation of the radio positioning report function. When the radio positioning report control unit 220 causes the user equipment 100 to activate the radio positioning report function, the user equipment 100 reports the activation and/or deactivation of the radio positioning function to the base station 200. On the other hand, when the radio positioning report control unit 220 causes the user equipment 110 to deactivate the radio positioning report function, the user equipment 100 stops reporting the activation and/or deactivation of the radio positioning function. When a frequency band resulting in interference with positioning signals is configured for the user equipment 100 in uplink carrier aggregation, the radio positioning report control unit 220 causes the user equipment 100 to activate the radio positioning report function, and when the radio positioning function is activated and/or deactivated during activation of the radio positioning report function, the radio positioning report control unit 220 causes the user equipment 100 to report activation and/or deactivation of the radio positioning function.

In one embodiment, upon receiving an activation report of the radio positioning function from the user equipment 100, the radio communication control unit 210 may control radio communication with the user equipment 100 to avoid the interference. Specifically, while the user equipment 100 activates the radio positioning function, the radio communication control unit 210 may schedule resource blocks, where the interference with positioning signals cannot arise, for the user equipment 100 in the uplink carrier aggregation and cause the user equipment 100 to transmit uplink data by using the resource blocks. Also, even if the uplink carrier aggregation is configured, during activation of the radio positioning function at the user equipment 100, the radio communication control unit 210 may cause the user equipment 100 to transmit uplink data by using only one carrier, delete the configured uplink carrier aggregation or deactivate a secondary cell (SCell).

In one embodiment, the radio communication control unit 210 may indicate transmission power to be reduced during activation of the radio positioning function to the user equipment 100. In LTE specifications, the radio communication control unit 210 may use an A-MPR parameter to indicate the maximum transmission power to be reduced under the case where the user equipment 100 activating the radio positioning function in the configured uplink carrier aggregation transmits uplink data in more than or equal to a number of resource blocks specified in the specification. At this time, when the user equipment 100 activates the radio positioning function in the configured uplink carrier aggregation, the user equipment 100 reduces the maximum transmission power by a power amount specified by the A-MPR under the case where the uplink data is transmitted in more than or equal to the number of resource blocks.

In one embodiment, when the uplink carrier aggregation configured for the user equipment 100 is deleted or the configured frequency band resulting in the interference is deleted, the radio positioning report control unit 220 may cause the user equipment 100 to deactivate the radio positioning report function. In other words, when the uplink carrier aggregation configured for the user equipment 100 is deleted or when the configured frequency band resulting in the interference is deleted, the radio positioning report control unit 220 may cause the user equipment 100 to deactivate the radio positioning report function so as to stop unnecessary radio positioning reports from the user equipment 100. In other words, if the frequency band resulting in the interference with positioning signals is not configured for the user equipment 100 in the uplink carrier aggregation, the radio positioning report control unit 220 does not cause the user equipment 100 to activate the radio positioning report function. As a result, if no interference arises due to inter-modulation distortion in the uplink carrier aggregation, unnecessary radio positioning reports from the user equipment 100 can be stopped.

Next, an uplink carrier aggregation communication operation according to one embodiment of the present invention is described with reference to FIGS. 5-7. FIG. 5 is a sequence diagram for illustrating an uplink carrier aggregation communication operation according to one embodiment of the present invention. The uplink carrier aggregation communication operation is described in conjunction with LTE specifications. The illustrated uplink carrier aggregation communication operation is based on a certain release in the LTE specifications, but the present invention is not limited to the release and may be applied to any other release using the uplink carrier aggregation such as subsequent releases.

As illustrated in FIG. 5, at step S101, a connection operation is performed between the user equipment 100 and the base station 200, and user capability indicating that the user equipment 100 supports an uplink carrier aggregation function is indicated to the base station 200. Note that if the connection between the user equipment 100 and the base station 200 has been already established and the base station 200 has already obtained the user capability for the user equipment 100, step S101 may be omitted.

At step S102, the base station 200 configures a frequency band resulting in interference with radio signals from the positioning system 300 for the user equipment 100 in the uplink carrier aggregation and causes the user equipment 100 to activate the radio positioning report function to report activation or deactivation of the radio positioning function based on radio signals received from the positioning system 300. Specifically, the base station 200 may configure the uplink carrier aggregation by transmitting a RRC (Radio Resource Control) Connection Reconfiguration to the user equipment 100 and cause the user equipment 100 to activate the radio positioning report function (idc-ForGNSS) to report activation and/or deactivation of the radio positioning function in an information element indicated to the user equipment 100 as illustrated in FIG. 6 (idc-ForGNSS=true).

At step S103, upon activating the radio positioning function (GNSS on), the user equipment 100 reports the activation of the radio positioning function to the base station 200 and performs uplink transmission. In one embodiment, the user equipment 100 may further report the positioning system 300, the center reception frequency of the positioning system 300 and the reception bandwidth of the positioning system 300 to the base station 200. For example, the user equipment 100 may indicate the activation of the radio positioning function (gNSS-ReceiverActivation-r11=true), the type (gNSS-Type-r11), the center reception frequency (recvFreq-r11) and the reception bandwidth (channelBW-r11) of the positioning system 300 utilized by the user equipment 100 in a message "GNSS-Info-r11" as illustrated in FIG. 7 to the base station 200. According to an example as illustrated in FIG. 5, the user equipment 100 uses these parameters to indicate "gNSS-ReceiverActivation-r11=true", "gNSS-Type-r11=GPS", "recvFreq-r11=1570" and "channelBW-r11=20" to the base station 200.

Upon receiving the report, the base station 200 controls radio communication with the user equipment 100 to avoid interference as stated above. For example, while the user equipment 100 activates the radio positioning function, the base station 200 may schedule resource blocks, where no interference with positioning signals can arise, for the user equipment 100 in uplink carrier aggregation and cause the user equipment 100 to transmit uplink data in the resource blocks. Also, even if the uplink carrier aggregation is configured, during activation of the radio positioning function at the user equipment 100, the base station 200 may cause the user equipment 100 to transmit uplink data by using only one carrier, delete the configured uplink carrier aggregation or deactivate a secondary cell (SCell).

At step S104, upon deactivating the radio positioning function (GNSS off), the user equipment 100 reports the deactivation of the radio positioning function to the base station 200. In one embodiment, the user equipment 100 may further report the positioning system 300, the center reception frequency of the positioning system 300 and the reception bandwidth of the positioning system 300 to the base station 200.

Then, at step S105, the base station 200 deletes the configured uplink carrier aggregation and causes the user equipment 100 to deactivate the radio positioning report function. For example, the base station 200 may cause the user equipment 100 to deactivate the radio positioning report function by setting "idc-ForGNSS=false" in the information element indicated to the user equipment 100 as illustrated in FIG. 6.

Figure 8:
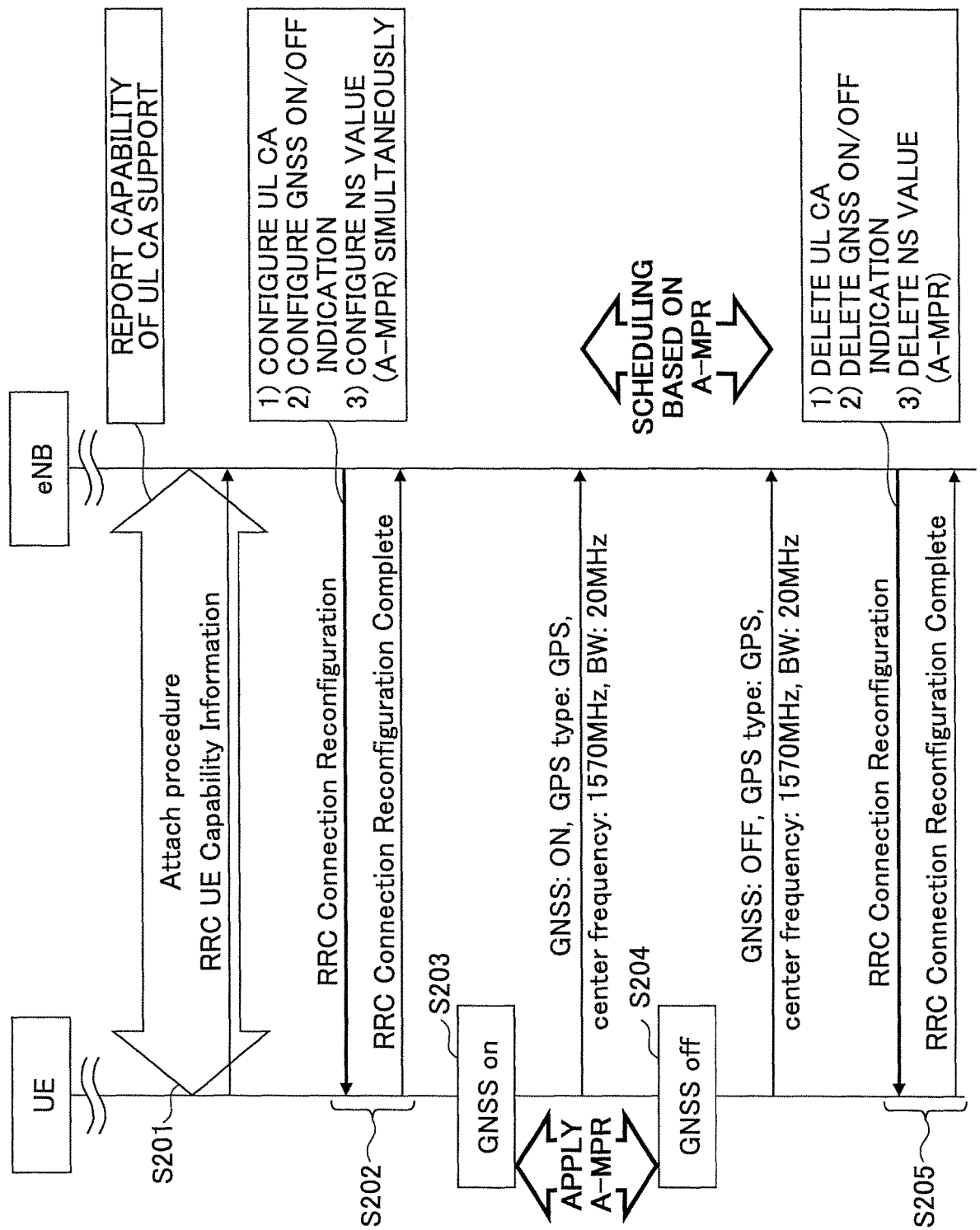
FIG. 8 is a sequence diagram for illustrating an uplink carrier aggregation communication operation according to another embodiment of the present invention.

Next, an uplink carrier aggregation communication operation according to another embodiment of the present invention is described with reference to FIGS. 8-10. FIG. 8 is a sequence diagram for illustrating an uplink carrier aggregation communication operation according to another embodiment of the present invention. This uplink carrier aggregation communication operation relates to an embodiment where transmission power is reduced in accordance with the A-MPR during activation of the radio positioning function in uplink carrier aggregation if uplink data is transmitted in more than or equal to a number of resource blocks and is described in conjunction with LTE specifications. The illustrated uplink carrier aggregation communication operation is based on a certain release in the LTE specifications, but the present invention is not limited to the release and may be applied to any other releases using uplink carrier aggregation such as subsequent releases.

As illustrated in FIG. 8, at step S201, a connection operation is performed between the user equipment 100 and the base station 200, and user capability indicating that the user equipment 100 supports an uplink carrier aggregation function is indicated to the base station 200. Here, if the connection between the user equipment 100 and the base station 200 has been already established and the base station 200 has already obtained the user capability for the user equipment 100, step S201 may be omitted.

At step S202, the base station 200 configures a frequency band resulting in interference with radio signals from the positioning system 300 for the user equipment 100 in the uplink carrier aggregation and causes the user equipment 100 to activate the radio positioning report function to report activation or deactivation of the radio positioning function based on radio signals received from the positioning system 300. Specifically, the base station 200 may configure the uplink carrier aggregation by transmitting a RRC Connection Reconfiguration to the user equipment 100 and cause the user equipment 100 to activate the radio positioning report function (idc-ForGNSS) to report the activation and/or deactivation of the radio positioning function (idc-ForGNSS=true). In addition, the base station 200 indicates an A-MPR for the user equipment 100 to reduce transmission power during activation of the radio positioning function in the uplink carrier aggregation. In one embodiment, the base station 200 may indicate the transmission power to be separately reduced for a primary cell and a secondary cell in the uplink carrier aggregation. For example, the base station 200 may indicate the A-MPR for the primary cell (PCell) in the uplink carrier aggregation with the information element "additionalSpectrumEmissionPcell2-r12" as illustrated in FIG. 9. Also, the base station 200 may indicate the A-MPR for the secondary cell (SCell) in the uplink carrier aggregation with the information element "additionalSpectrumEmissionScell2-r12" as illustrated in FIG. 10.

At step S203, upon activating the radio positioning function (GNSS on), the user equipment 100 reports the activation of the radio positioning function to the base station 200 and if uplink data is transmitted in more than or equal to the number of resource blocks in accordance with an instruction from the base station 200, performs the uplink transmission at the reduced transmission power. In one embodiment, the user equipment 100 may further report the positioning system 300, the center reception frequency of the positioning system 300 and the reception bandwidth of the positioning system 300 to the base station 200.

Upon receiving the report, the base station 200 controls radio communication with the user equipment 100 to avoid interference as stated above. For example, while the user equipment 100 activates the radio positioning function, the base station 200 may schedule resource blocks, where interference with positioning signals cannot arise, for the user equipment 100 in the uplink carrier aggregation and cause the user equipment 100 to transmit uplink data in the resource blocks. Also, even if the uplink carrier aggregation is configured, during activation of the radio positioning function at the user equipment 100, the base station 200 may transmit uplink data to the user equipment 100 by using only one carrier, delete the configured uplink carrier aggregation or deactivate a secondary cell (SCell).

At step S204, upon deactivating the radio positioning function (GNSS off), the user equipment 100 reports the deactivation of the radio positioning function to the base station 200. In one embodiment, the user equipment 100 may further report the positioning system 300, the center reception frequency of the positioning system 300 and the reception bandwidth of the positioning system 300 to the base station 200.

Then, at step S205, the base station 200 deletes the configured uplink carrier aggregation and causes the user equipment 100 to deactivate the radio positioning report function. For example, the base station 200 may cause the user equipment 100 to deactivate the radio positioning report function by setting "idc-ForGNSS=false" in the information element indicated to the user equipment 100 as illustrated in FIG. 6. In addition, the base station 200 indicates deletion of the A-MPR for the user equipment 100 to reduce transmission power during activation of the radio positioning function in the uplink carrier aggregation.

In the above-stated embodiments, the uplink carrier aggregation communication operation to avoid positioning signals incurring interference due to inter-modulation distortion caused by the uplink carrier aggregation has been described. However, the present invention is not limited to the interference with the positioning signals and can be applied to any other communication system where interference is incurred due to the inter-modulation distortion caused by the uplink carrier aggregation.

Figure 11:
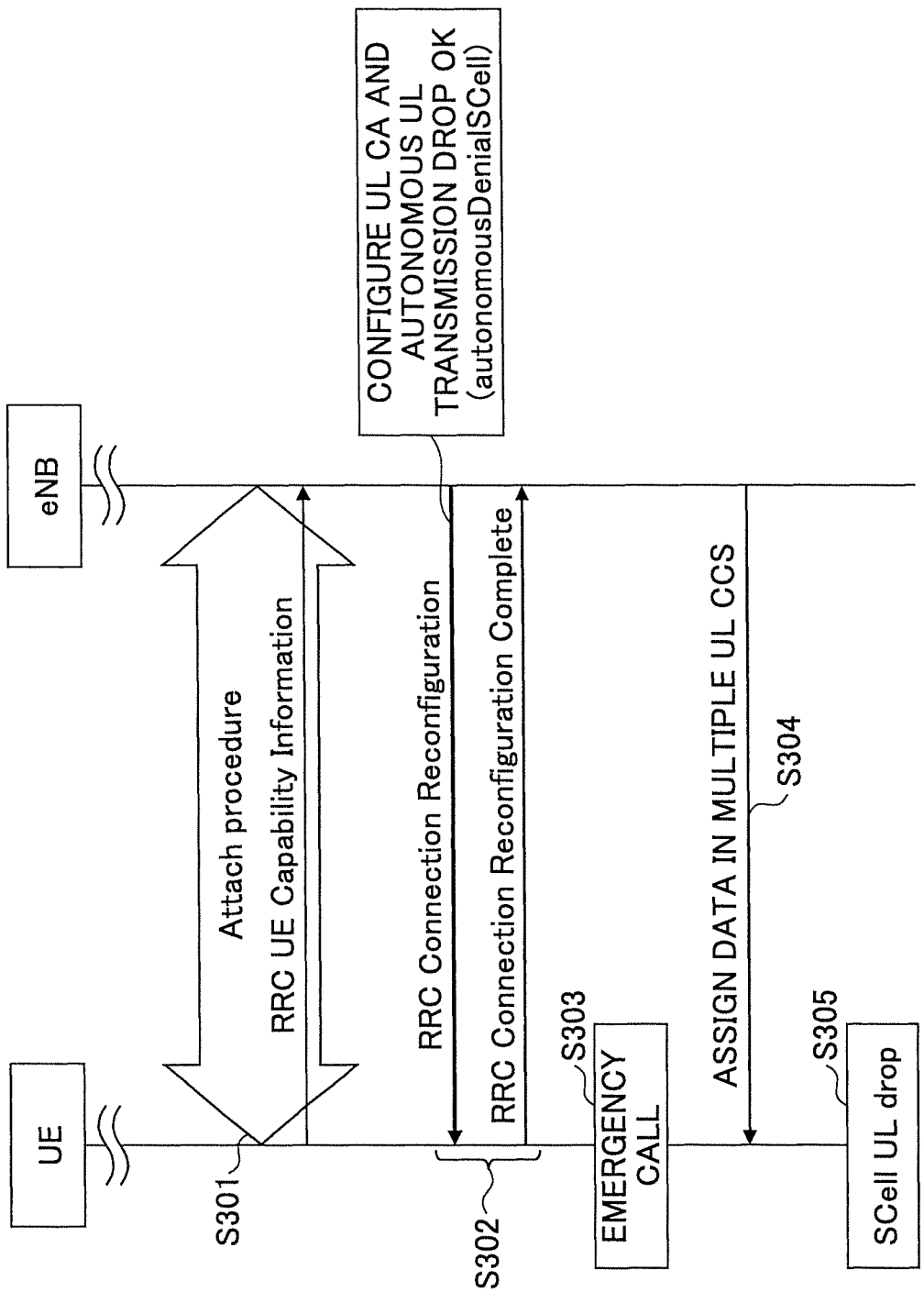
FIG. 11 is a sequence diagram for illustrating an uplink carrier aggregation communication operation according to another embodiment of the present invention.

Next, an uplink carrier aggregation communication operation according to another embodiment of the present invention is described with reference to FIGS. 11-12. FIG. 11 is a sequence diagram for illustrating an uplink carrier aggregation communication operation according to another embodiment of the present invention. This uplink carrier aggregation communication operation relates to an embodiment where the base station 200 controls autonomous operations for the user equipment 100 to ensure activation of the radio positioning function in an emergency call and is described in conjunction with LTE specifications. The illustrated uplink carrier aggregation communication operation is based on a certain release of the LTE specifications, but the present invention is not limited to the release and may be applied to any other release using the uplink carrier aggregation such as subsequent releases.

In cases where an emergency call is transmitted to alert to an emergency response organization such as a police station and a fire station, an emergency calling position indication function is provided to automatically obtain position information on the transmitting location and indicate the obtained position information to the destination. In order to protect the emergency calling position indication function, it is discussed in the LTE specifications that the base station 200 does not assign resources in multiple uplink component carriers for the user equipment 100 making an emergency call (3GPP R4-148117). If the base station 200 has supposedly assigned resources in the multiple uplink component carriers for the user equipment 100 presently transmitting an emergency call, the user equipment 100 is enabled to stop uplink transmission for a secondary cell autonomously. However, if the user equipment 100 has autonomously stopped the uplink transmission for the secondary cell in this manner, the base station 200 cannot know this autonomous operation promptly and accordingly is likely to assign unnecessary uplink resources for the user equipment 100. From this reason, according to this embodiment, the base station 200 is enabled to control the autonomous operation at the user equipment 100.

As illustrated in FIG. 11, at step S301, a connection operation is performed between the user equipment 100 and the base station 200, and user capability indicating that the user equipment 100 supports an uplink carrier aggregation function is indicated to the base station 200. In this embodiment, the radio communication control unit 110 in the user equipment 100 has an autonomous transmission stop function to stop, if uplink resources are assigned in multiple component carriers, uplink transmission for the secondary cell during transmission of an emergency call and can activate the autonomous transmission stop function in accordance with an activation permission from the base station 200. Here, if the connection between the user equipment 100 and the base station 200 has been already established and the base station 200 has already obtained the user capability for the user equipment 100, step S301 may be omitted.

At step S302, the base station 200 configures a frequency band resulting in interference with radio signals from the positioning system 300 for the user equipment 100 in uplink carrier aggregation and causes the user equipment 100 to activate the radio positioning report function to report activation or deactivation of the radio positioning function based on radio signals received from the positioning system 300. In addition, if uplink resources are assigned in multiple component carriers, the base station 200 uses the radio positioning report control unit 220 to permit the user equipment 100 to activate the autonomous transmission stop function to stop uplink transmission for the secondary cell during transmission of an emergency call. Specifically, the base station 200 configures uplink carrier aggregation by transmitting a RRC Connection Reconfiguration to the user equipment 100 and indicates an activation instruction (idcForGNSS=true) of the radio positioning report function to report activation and/or deactivation of the radio positioning function and an activation permission (autonomousDenialSCell=setup) of the autonomous transmission stop function to the user equipment 100.

At step S303, the user equipment 100 transmits an emergency call to an emergency response organization such as a police station and a fire station.

At step S304, the base station 200 assigns resources in multiple uplink component carriers for the user equipment 100.

At step S305, the user equipment 100 activates the autonomous transmission stop function in accordance with an activation permission (autonomousDenialSCell=setup) of the autonomous transmission stop function indicated from the base station 200 at step S302 and stops the uplink transmission for the secondary cell assigned at step S303.

According to the above-stated embodiment, the base station 200 can control activation of the autonomous transmission stop function by the user equipment presently transmitting an emergency call and know operations assumed for the user equipment 100, which can avoid assigning unnecessary uplink resources for the user equipment 100 presently transmitting an emergency call.

Next, the user equipment according to another embodiment of the present invention is described with reference to FIGS. 13-15. In the above-stated embodiments, a reception band of radio signals from the positioning system 300 is focused on as a frequency band overlapping with an occurrence area of inter-modulation distortion due to uplink carrier aggregation. However, the present invention is not limited to the positioning system 300 and may be applied to any other radio communication system using a frequency band interfered with due to uplink transmission from the user equipment 100. For example, a radio communication system (such as a Wi-Fi and Bluetooth (registered trademark)) using an unlicensed band such as 2.4 GHz and 5 GHz may be considered as an interfered system 400 (not shown) incurring such interference. In this embodiment, the interfered system 400 incurring interference due to uplink carrier aggregation is focused on.

Figure 13:
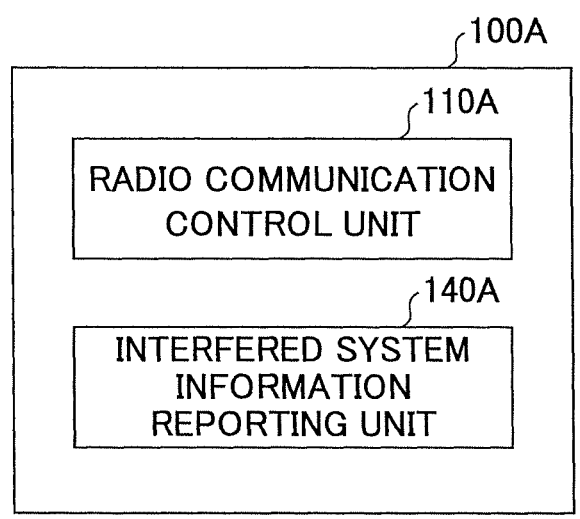
FIG. 13 is a block diagram for illustrating a functional arrangement of the user equipment according to another embodiment of the present invention.

FIG. 13 is a block diagram for illustrating a functional arrangement of the user equipment according to another embodiment of the present invention. As illustrated in FIG. 13, the user equipment 100A has a radio communication control unit 110A and an interfered system information reporting unit 140A.

The radio communication control unit 110A controls radio communication with the base station 200. Specifically, similar to the radio communication control unit 110, the radio communication control unit 110A transmits and receives various radio channels such as uplink/downlink control channels and uplink/downlink data channels to/from the base station 200 and uses multiple carriers served by the base station 200 simultaneously to perform uplink carrier aggregation for transmitting radio signals to the base station 200.

The interfered system information reporting unit 140A reports system information on the interfered system 400 incurring interference due to uplink carrier aggregation to the base station 200. For example, the user equipment 100A can wirelessly communicate with not only the base station 200 but also the interfered system 400, such as Wi-Fi and Bluetooth (registered trademark), using an unlicensed band incurring interference due to uplink carrier aggregation. In response to starting or stopping radio communication with the interfered system 400 in the configured uplink carrier aggregation, the interfered system information reporting unit 140A reports the start and/or stop of the radio communication to the base station 200.

In one embodiment, the system information may include a center frequency and a reception bandwidth of the interfered system 400. The user equipment 100A can use various interfered systems 400 such as Wi-Fi and Bluetooth (registered trademark), and the interfered system information reporting unit 140A indicates the center frequency and the reception bandwidth of the interfered system 400 to the base station 200. Upon receiving the center frequency and the reception bandwidth of the interfered system 400 from the user equipment 100A, the base station 200 can know details of a band (such as an unlicensed band) for use in radio communication between the user equipment 100A and the interfered system 400 and control the radio communication with the user equipment 100A more appropriately to avoid interference. For example, the interfered system information reporting unit 140A may use a signaling data structure as illustrated in FIG. 14 to indicate system information "VictimSystemInfo" indicative of the center frequency "recvFreq" and the reception bandwidth "channelBW" of the interfered system 400 to the base station 200. If multiple interfered systems 400 are present, the interfered system information reporting unit 140A may report respective system information of these interfered systems 400 to the base station 200.

In one embodiment, the interfered system information reporting unit 140A may be activated or deactivated in accordance with an instruction from the base station 200. Specifically, the base station 200 instructs the user equipment 100A to report start and/or stop of radio communication with the interfered system 400, and only if the report instruction is received, the interfered system information reporting unit 140A may report start and/or stop of the radio communication with the interfered system 400. As a result, only if a carrier resulting in interference in the radio communication with the interfered system 400 during execution of uplink carrier aggregation is configured for the user equipment 100A, the base station 200 can cause the user equipment 100A to report start and/or stop of the radio communication with the interfered system 400. In other words, if the carrier resulting in interference with the interfered system 400 is not configured for the user equipment 100A even in execution of the uplink carrier aggregation, the base station 200 can avoid receiving unnecessary reports of start and/or stop of the radio communication with the interfered system 400. For example, when the uplink carrier aggregation is configured, the base station 200 may use a signaling data structure as illustrated in FIG. 15 to instruct the user equipment 100A to transmit an intra-device coexistence indication "InDeviceCoexlndication" including the system information "VictimSystemInfo" of the interfered system 400 to the base station 200. According to the illustrated signaling data structure, when "idc-ForUL CA" is set to "TRUE", in response to the uplink carrier aggregation being configured, the interfered system information reporting unit 140A may transmit the intra-device coexistence indication "InDeviceCoexlndication" including the system information "VictimSystemInfo" of the interfered system 400 to the base station 200. Also, if the uplink carrier aggregation configured for the user equipment 100A is deleted, the base station 200 may cause the user equipment 100A to report start and/or stop the radio communication with the interfered system 400.

Upon receiving reports of start and/or stop of the radio communication with the interfered system 400, the base station 200 can control the radio communication with the user equipment 100A to avoid interference. For example, while the user equipment 100A activates radio communication with the interfered system 400, the base station 200 may schedule resource blocks, where no interference with the interfered system 400 can arise, for the user equipment 100A in the uplink carrier aggregation and cause the user equipment 100A to transmit uplink data in the resource blocks. Also, even if the uplink carrier aggregation is configured, during activation of the radio communication with the interfered system 400 at the user equipment 100A, the base station 200 may cause the user equipment 100A to transmit uplink data by using only one carrier, delete the configured uplink carrier aggregation or deactivate a secondary cell (SCell).

In one embodiment, upon receiving an instruction to reduce transmission power on behalf of radio communication with the interfered system 400 from the base station 200, the radio communication control unit 110A may reduce the transmission power during activation of the radio communication with the interfered system 400 and perform uplink carrier aggregation communication with the base station 200. In order to reduce interference with the interfered system 400 due to inter-modulation distortion caused during execution of the uplink carrier aggregation, the radio communication control unit 110A may apply transmission power reduction indicated from the base station 200 to the uplink communication. In the LTE specifications, the base station 200 may use the A-PMR parameter to indicate the maximum transmission power to be reduced by the user equipment 100A during activation of the radio communication with the interfered system 400 in the configured uplink carrier aggregation. At this time, upon activating the radio communication with the interfered system 400 in the configured uplink carrier aggregation, the radio communication control unit 110A reduces the maximum transmission power by a power amount specified by the A-MPR during execution of the radio communication.

Next, the user equipment according to another embodiment of the present invention is described with reference to FIGS. 16-17. In the above-stated embodiments, the system information on one or more interfered systems 400 incurring interference due to uplink carrier aggregation is reported to the base station 200 so as to avoid uplink interference. On the other hand, the uplink interference is not limited to the above-stated inter-modulation distortion (IMD) caused due to the uplink carrier aggregation and may also arise due to other causes such as a harmonic component for single-carrier uplink transmission. From this reason, by indicating the interference causes to the base station 200, the base station 200 can address the uplink interference appropriately.

Figure 16:
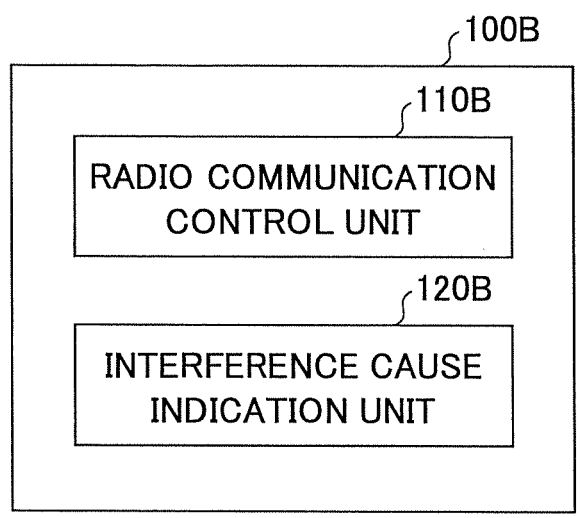
FIG. 16 is a block diagram for illustrating a functional arrangement of the user equipment according to another embodiment of the present invention.

FIG. 16 is a block diagram for illustrating a functional arrangement of the user equipment according to another embodiment of the present invention. As illustrated in FIG. 16, the user equipment 100B has a radio communication control unit 110B and an interference cause indication unit 120B.

The radio communication control unit 110B controls radio communication with the base station 200. Specifically, similar to the radio communication control units 110 and 110A, the radio communication control unit 110B transmits and receives various radio channels such as uplink/downlink control channels and uplink/downlink data channels to/from the base station 200 and uses multiple carriers served by the base station 200 simultaneously to perform uplink carrier aggregation for transmitting radio signals to the base station 200. Also, the radio communication control unit 1103 supports uplink transmission in accordance with a single carrier scheme. In the single-carrier uplink transmission, it is known that a harmonic component causes interference.

The interference cause indication unit 120B indicates an uplink interference cause to the base station 200. In one embodiment, the uplink interference cause may be inter-modulation distortion caused by uplink carrier aggregation or a harmonic of single-carrier uplink transmission. For example, if uplink interference is caused due to inter-modulation distortion arising in the uplink carrier aggregation, the interference cause indication unit 120B indicates to the base station 200 that the interference cause is the inter-modulation distortion (IMD) caused due to the uplink carrier aggregation. On the other hand, if the uplink interference is caused due to a harmonic component in the single-carrier uplink transmission, the interference cause indication unit 120B indicates to the base station 200 that the interference cause is the harmonic component in the single-carrier uplink transmission.

Specifically, as illustrated in FIG. 17, the interference cause indication unit 120B may indicate the interference cause in the information element "interferenceCauseUL" in the intra-device coexistence indication "InDeviceCoexlndication". For example, if the interference cause is the inter-modulation distortion caused due to the uplink carrier aggregation, the interference cause indication unit 120B may set the value of "interferenceCauseUL" to "imd" and indicate "InDeviceCoexlndication" to the base station 200. Also, if the interference cause is the harmonic component of the single-carrier uplink transmission, the interference cause indication unit 120B may set the value of "interferenceCauseUL" to "harmonics" and indicate "InDeviceCoexIndication" to the base station 200. Note that the uplink interference cause is not limited to them, and any other cause may be indicated to the base station 200.

Although the embodiments of the present invention have been described in detail, the present invention is not limited to the above-stated specific embodiments, and various modifications and variations can be made within the spirit of the present invention as recited in claims.

This international patent application is based on and claims benefits of priority of Japanese Priority Applications No. 2014-227473 filed on Nov. 7, 2014, No. 2015-014550 filed on Jan. 28, 2015, No. 2015-098863 filed on May 14, 2015 and No. 2015-160090 filed on Aug. 14, 2015, the entire contents of which are hereby incorporated by reference.

LIST OF REFERENCE SYMBOLS

10: radio communication system
100, 100A, 100B: user equipment
200: base station
300: positioning system
400: interfered system

The invention claimed is:

1. User equipment having an uplink carrier aggregation function, comprising:
a processor that controls radio communication with a base station; and
a transmitter that reports, to the base station, information that includes types of interfered Global Navigation Satellite systems due to uplink carrier aggregation to the base station.

2. The user equipment as claimed in claim 1, wherein the information includes a center frequency and a reception bandwidth of the at least ono types of interfered Global Navigation Satellite systems.

3. The user equipment as claimed in claim 1, wherein an uplink interference cause is further indicated to the base station.

4. The user equipment as claimed in claim 3, wherein the uplink interference cause is inter-modulation distortion caused by uplink carrier aggregation or a harmonic of single-carrier uplink transmission.

5. The user equipment as claimed in claim 2, wherein an uplink interference cause is further indicated to the base station.

6. The user equipment as claimed in claim 1, wherein the information includes information indicating that an uplink interference cause is inter-modulation distortion caused by uplink carrier aggregation or a harmonic of single-carrier uplink transmission.

* * * * *